(12) United States Patent
Turan-Altuntas et al.

(10) Patent No.: US 11,359,052 B2
(45) Date of Patent: Jun. 14, 2022

(54) PEBA-BASED COMPOSITION AND USE THEREOF FOR PRODUCING A FATIGUE-RESISTANT TRANSPARENT OBJECT

(71) Applicant: Arkema France, Colombes (FR)

(72) Inventors: Inci Turan-Altuntas, Val de Reuil (FR); Quentin Pineau, Evreux (FR); Philippe Blondel, Bernay (FR); Mathieu Sabard, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/612,110

(22) PCT Filed: May 4, 2018

(86) PCT No.: PCT/FR2018/051130
§ 371 (c)(1),
(2) Date: Nov. 8, 2019

(87) PCT Pub. No.: WO2018/206889
PCT Pub. Date: Nov. 15, 2018

(65) Prior Publication Data
US 2020/0115500 A1    Apr. 16, 2020

(30) Foreign Application Priority Data

May 11, 2017 (FR) ........................ 1754154

(51) Int. Cl.
*C08G 69/40* (2006.01)
(52) U.S. Cl.
CPC .................... *C08G 69/40* (2013.01)
(58) Field of Classification Search
CPC ................ C08G 69/40; C08G 69/44
See application file for complete search history.

(56) References Cited

U.S. PATENT DOCUMENTS

| 2005/0165210 A1 | 7/2005 | Malet et al. |
| 2009/0274913 A1* | 11/2009 | Okushita ............... B32B 27/40 |
| | | 428/423.5 |
| 2010/0140846 A1 | 6/2010 | Montanari et al. |
| 2013/0202831 A1 | 8/2013 | Chhun et al. |
| 2014/0134371 A1 | 5/2014 | Hoffmann et al. |
| 2016/0251484 A1 | 9/2016 | Malet |

FOREIGN PATENT DOCUMENTS

| CN | 101472975 A | 7/2009 |
| CN | 101501138 A | 8/2009 |
| CN | 105612197 A | 5/2016 |
| EP | 2036939 A1 | 3/2009 |
| JP | 2006503951 A | 2/2006 |
| JP | 2007145324 A | 12/2007 |
| JP | 2013538912 A | 10/2013 |
| JP | 2016532728 A | 10/2016 |
| WO | 2004037898 A1 | 5/2004 |
| WO | 2008006987 A1 | 1/2008 |

OTHER PUBLICATIONS

Office Action (Notice of Reasons for Rejection) dated Nov. 17, 2020, by the Japanese Patent Office in corresponding Japanese Patent Application No. 2019-561842, English Translation only. (6 pages).
International Search Report (PCT/ISA/210) dated Aug. 8, 2018, by the French Patent Office as the International Searching Authority for International Application No. PCT/FR2018/051130.
Office Action (The First Office Action) dated Aug. 24, 2021, by the China National Intellectual Property Administration in corresponding Chinese Patent Application No. 201880038670.9, and an English Translation of the Office Action. (18 pages).

* cited by examiner

*Primary Examiner* — Ana L. Woodward
(74) *Attorney, Agent, or Firm* — Buchanan Ingersoll & Rooney P.C.

(57) ABSTRACT

The present invention relates to a copolymer with a rigid polyamide block and a flexible polyether or polyester block, wherein said polyamide block is semicrystalline and consists of a copolyamide of W/Y.Z type, wherein:
  (i) W is a lactam or an alpha, omega-aminocarboxylic acid;
  (ii) Y is a cycloaliphatic diamine;
  (iii) Z is an aliphatic and/or aromatic dicarboxylic acid; and the W/Y.Z molar ratio is between 10/1 and 27/1 limits excluded.

15 Claims, No Drawings

PEBA-BASED COMPOSITION AND USE THEREOF FOR PRODUCING A FATIGUE-RESISTANT TRANSPARENT OBJECT

The invention relates to the use of novel compositions of thermoplastic elastomer (TPE) polymers which are transparent, can be easily injection molded, and enable the manufacture of objects which combine excellent properties of transparency and fatigue strength (Rossflex) and impact resistance (Charpy impact). The invention more particularly relates to the manufacture of transparent objects, particularly suitable for the sports, optics and electronics markets.

For the purposes of the invention, the term "transparent composition" means a composition with a transmittance at least equal to 80% according to the ISO 13468 standard, and a haze of less than 18%, preferably less than 15%, according to the ASTM D1003-97 standard, these two properties being measured at 560 nm through a 2-mm thick sheet.

Among the TPEs, mention may be made of those based on polyamide, and in particular "polyether block and polyamide block copolymers" which are hereinafter abbreviated "PEBA". Two main routes have been explored to improve the transparency of these TPEs.

The first route is the copolymerization of the polyamide making it possible to reduce the crystallinity of a polyamide-based TPE and thus to improve its transparency. The drawback is the poor injection moldability of the copolyamide-based products thus obtained.

The second route is the use of cycloaliphatic diamines which disrupt and break up the crystallinity of polyamide-based TPE. This results in amorphous products having excellent optical properties but insufficient mechanical properties and that are difficult or even impossible to injection mold.

Patent document WO 04037898 describes the use of PA blocks consisting of a linear semialiphatic predominant monomer and of a sufficient amount of at least one comonomer in order to decrease the crystallinity. Mention may particular be made of two examples of PEBA of this type:
  PA6/12—PTMG where the PA block is 1300 g/mol and the PTMG block is 650 g/mol;
  PA12/IPD. 10/PTMG where the PA block is 1780 g/mol and the PTMG is 650 g/mol. The injection molding of such products is problematic.

Patent document WO08/006987 describes the synthesis of copolymers, the amide units of which consist predominantly of an equimolar combination of at least one diamine and at least one dicarboxylic acid, the diamine(s) being predominantly cycloaliphatic and the dicarboxylic acid(s) being predominantly linear and aliphatic, the amide units being able to optionally comprise, in a minor amount, at least one other polyamide comonomer, the respective proportions of monomers of the ether and amide units being chosen so that: the copolymer is amorphous or has a crystallinity such that the enthalpy of fusion during the second heating of an ISO 11357-3: 2013 DSC is at most equal to 30 J/g, and a Tg at least equal to 75° C. By way of example of this copolymer, mention may in particular be made of the following PEBA: PAB. 10/B. 12-PTMG in which the PA block is 5000 g/mol and the PTMG block is 650 g/mol, which has very good optical properties comparable to a pure PAB.12, but insufficient mechanical properties, in particular in terms of fatigue behavior.

Patent document US2014134371 describes amorphous transparent elastomeric polyamides, in which the PA segment contains from 10 to 100 mol % of BMACM or PACM out of the total amount of diamine(s) in the PA block. In this document, the elastomer comprises an amorphous phase derived from the polyether segment, displaying a Tg measured by DSC equal to at most 20° C. The formulations described in the aforementioned document have insufficient fatigue strength (Rossflex) properties. Among the formulations described, mention may be made of the product PA B. 12-Elastamine RP 409 in which the PA block is 1000 g/mol, the glass transition temperature (Tg) of the PA phase is 80° C., and the enthalpy of fusion is close to 10 J/g.

Today an alternative to the aforementioned PEBAs is sought by transparent, fatigue resistant and impact resistant materials, which do not deform after injection molding, have improved mechanical properties and in particular elastic fatigue strength, and are easy to process with existing polymer-shaping processes or devices.

More specifically, the object of the present invention is to provide new polymer compositions which can easily be injection molded and which avoid the problems of hot deformation or annealing, in particular after injection molding; for the manufacture of a transparent object that is resistant to impact and to elastic fatigue. In particular, the composition of the present invention aims to obtain, by injection molding, an object:
  with optical properties such that it has:
    a "transparency" such that the transmittance of the material is greater than 80%, preferably at least equal to 85% at 560 nm through a 2-mm thick sheet (according to the ISO 13468 standard),
    a "haze" such that its value does not exceed 17, preferably does not exceed 14, measured according to the ASTM D1003-97 standard,
  with mechanical properties such that it has:
    a Charpy notched "impact strength" ("no breakage" at 23° C.) according to the ISO 179-1:2010 method 1eA standard,
    an "elastic fatigue strength" or "elastic fatigue" or "Rossflex" such that the material is capable of being bent at least 100 000 times without breakage, thus with elastic recovery, in the "Ross-Flex" test.

The "Ross Flex" fatigue test is carried out in accordance with the ASTM D1052 standard. Parts with a thickness of 2 mm are produced. These parts are pierced with a hole 2.5 mm in diameter and then conditioned for 15 days at 23° C. under 50% relative humidity. This "Ross Flex" test is used to determine the number of times after which the part, bent at the hole to 600 and at a temperature of −10° C., breaks. The part is considered to satisfy the conditions of this test when the number of cycles is greater than or equal to 100 000.

Another objective of the present invention is to provide a process for manufacturing such TPEs that is simple, easy to implement, rapid (which has the least possible steps), and which avoids the problems of deformation or annealing, in particular after injection molding.

A means has now been found for obtaining a TPE that combines all these properties via the use of a particular range of polyether block and polyamide block copolymers according to the invention.

DETAILED DESCRIPTION OF THE INVENTION

In the present description, it is specified that:
the limits are excluded when "between" two limits is written, and the limits are included when "the range from X to Z" or "represent X % to Y %" is written.

One subject of the present invention is therefore a (PEBA) copolymer with a rigid polyamide (PA) block and a flexible polyether or polyester (PE) block, wherein said polyamide block is semicrystalline and consists of a copolyamide of W/Y.Z type, wherein:
(i) W is a lactam or an alpha, omega-aminocarboxylic acid;
(ii) Y is a cycloaliphatic diamine;
(iii) Z is an aliphatic and/or aromatic dicarboxylic acid;
and the W/Y.Z molar ratio is between 10/1 and 27/1 limits excluded.

Within the meaning of the invention, the expression "copolymer containing PE block(s) and PA block(s)" covers, in particular, PEBAs comprising one or more PE blocks and one or more PA blocks.

Preferably, the W/Y.Z molar ratio of said copolymer is within the range of from 14/1 to 24/1, preferably from 15/1 to 20/1, preferably from 17/1 to 20/1.

Advantageously, the percentage by weight of the various components is such that:
(i) the percentage of the monomer W is within the range of 75% and 98% by weight, preferably from 80% to 90%;
(ii) the percentage of the Y.Z monomers is within the range of 2% and 25%, preferably from 10% to 20%;
forming a total of 100% of the polyamide block.

Advantageously, the percentage of polyamide blocks in the copolymer is within the range of from 60% to 97%, preferably from 65% to 95% and the percentage of polyether blocks in the copolymer is within the range of from 3% to 40%, preferably from 5% to 35%.

This particular composition of the PA blocks (content and chemistry) of the PEBA helps in particular to obtain a transparency (transmittance at least equal to 80%) that complies with the requirements of the invention.

According to a preferred embodiment, the copolymer according to the invention is characterized in that W is chosen from: caprolactam, oenantholactam, lauryllactam, aminocaproic acid, 7-aminoheptanoic acid, 11-aminoundecanoic acid and 12-aminododecanoic acid.

The term "monomer" in the present description of the polyamides should be taken as meaning "repeating unit". Indeed, the case where a repeating unit of the PA consists of the combination of a diacid with a diamine is particular. It is considered that it is the combination of a diamine and a diacid, that is to say the diamine.diacid pair (in an equimolar amount), which corresponds to the monomer. This is explained by the fact that, individually, the diacid or the diamine is only one structural unit, which is not enough on its own to be polymerized.

"Y.Z" forms an equimolar combination of at least one cycloaliphatic diamine and at least one aliphatic, preferably linear, dicarboxylic acid, having from 12 to 36 carbon atoms, preferably from 12 to 18 carbon atoms. The case having 36 carbon atoms includes in particular the use of fatty acid dimers, such as those of the Pripol® brand, for example Pripol® 1009. The dicarboxylic acid Z may also be chosen from aromatic diacids, in particular isophthalic acid (I), terephthalic acid (T), and mixtures thereof.

Advantageously, the cycloaliphatic diamine Y is chosen from: bis(3,5-dialkyl-4-aminocyclohexyl)methane, bis(4-aminocyclohexyl)methane (BACM), bis(3,5-dialkyl-4-aminocyclohexyl)ethane, bis(3,5-dialkyl-4-aminocyclohexyl)propane, 2,2-bis(3-methyl-4-aminocyclohexyl)propane (BMACP), bis(3,5-dialkyl-4-aminocyclohexyl)butane, bis (3-methyl-4-aminocyclohexyl)methane (BMACM or MACM), p-bis(aminocyclohexyl)methane (PACM), isopropylidenedi(cyclohexylamine) (PACP), isophoronediamine (IPD), 2,6-bis(aminomethyl)norbornane (BAMN), 1,3-cyclohexanebis(methylamine) (1,3-BAC).

Advantageously, the bis(3-methyl-4-aminocyclohexyl) methane is used as diamine Y for obtaining the PA blocks.

Advantageously, the aliphatic and/or aromatic dicarboxylic acid is chosen from aliphatic and/or aromatic dicarboxylic acids having from 6 to 36 carbon atoms, preferably from 9 to 18 carbon atoms, in particular pripol, 1,10-decanedicarboxylic acid, 1,12-dodecanedicarboxylic acid, 1,14-tetradecanedicarboxylic acid and 1,18-octadecanedicarboxylic acid.

According to a preferred embodiment of the invention, said copolymer is characterized in that the number-average molecular mass of the PA blocks is within the range of from 500 to 18 000 g/mol, preferably within the range of from 1000 to 15 000 g/mol, and the number-average molecular mass of the PE blocks is within the range of from 500 to 2000 g/mol, preferably within the range of from 650 to 1000 g/mol.

Preferably, the PE blocks of the copolymer according to the invention are derived from at least one polyalkylene ether polyol, in particular a polyalkylene ether diol, a polyoxyalkylene with $NH_2$ chain ends, and mixtures thereof. Advantageously, the polyalkylene ether diol is chosen from polyethylene glycol (PEG), polypropylene glycol (PPG), polytrimethylene glycol (PO3G), polytetramethylene glycol (PTMG) and mixtures thereof. The PE blocks may comprise polyoxyalkylene sequences with $NH_2$ chain ends, such sequences being able to be obtained by cyanoacetylation of aliphatic alpha,omega-dihydroxylated polyoxyalkylene sequences, referred to as polyether diols. More particularly, use may be made of the products of the Jeffamine® brand (for example Jeffamine® D400, D2000, ED 2003, XTJ 542, commercial products from Huntsman). Said at least one PE block preferably comprises at least one polyether chosen from polyalkylene ether polyols, such as PEG, PPG, PO3G, PTMG, polyethers containing polyoxyalkylene sequences with $NH_2$ chain ends, and statistical and/or block copolymers (copolyethers) thereof, and mixtures thereof.

Preferably, the polyester blocks (hereinafter abbreviated as PES) within the meaning of the invention are polyesters usually produced by polycondensation between a dicarboxylic acid and a diol. Suitable carboxylic acids include those mentioned above used to form the polyamide blocks with the exception of aromatic acids, such as terephthalic and isophthalic acid. Suitable diols include linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane and 1,4-cyclohexanedimethanol.

Polyesters are also understood to mean poly(caprolactone) and PES based on fatty acid dimers, in particular products from the PRIPLAST® range from Croda or Uniqema.

It is also possible to envisage a PES block of alternating, statistical or block "copolyester" type, containing a chain of at least two types of PES mentioned above.

Advantageously, the copolymer according to the invention has:
a transparency such that the transmittance at 560 nm through a 2-mm thick sheet is at least 80%;
a melting point within the range of from 130° C. to 210° C.;

and
a crystallinity such that the enthalpy of fusion during the second heating (delta Hm(2)) is within the range of from 30 to 60 J/g, preferably 35 to 60 J/g, the mass being relative to the amount of amide units contained or of polyamide contained, this fusion corresponding to that of the amide units; the melting point and the enthalpy of fusion being measured according to the ISO 11357-3: 2013 DSC standard.

Another subject of the present invention is a process for preparing a copolymer according to the invention, as defined above, characterized by the following steps:
in a first step, the polyamide PA blocks are prepared by polycondensation
of the lactam or an alpha,omega-aminocarboxylic acid W;
of the cycloaliphatic diamine Y and of the aliphatic and/or aromatic carboxylic diacid Z;
in the optional presence of a chain stopper chosen from dicarboxylic acids; then
in a second step, the polyamide PA blocks W/Y.Z obtained are reacted with polyether PE blocks, in the presence of a catalyst.

According to an alternative embodiment, the process for preparing a copolymer according to the invention is characterized by the one-step polycondensation:
of the lactam or an alpha,omega-aminocarboxylic acid W;
of the cycloaliphatic diamine Y and of the aliphatic and/or aromatic carboxylic diacid Z;
in the optional presence of a chain stopper chosen from dicarboxylic acids;
in the presence of the polyether PE blocks;
in the presence of a catalyst for the reaction between the PE blocks and the PA blocks.

Another subject of the present invention is a composition comprising the copolymer according to the invention and at least one additive. The additive is chosen in particular from coloring agents, in particular pigments, dyes, effect pigments, such as diffractive pigments, interference pigments, such as pearlescent agents, reflective pigments and mixtures thereof; UV stabilizers, anti-aging agents, antioxidants, fluidizing agents, anti-abrasion agents, mold-release agents, stabilizers, plasticizers, impact modifiers, surfactants, brighteners, fillers, fibers, waxes and mixtures thereof, and/or any other additive well known in the field of polymers. Among the fillers, mention may in particular be made of silica, carbon black, carbon nanotubes, expanded graphite, titanium oxide or else glass beads.

In particular, one subject of the present invention is a transparent thermoplastic polymer composition based on polyamide, said composition comprising from 80% to 99.9% by weight of copolymer according to the invention and from 0.01% to 20% of at least one additive chosen from: heat stabilizers, UV stabilizers, dyes, nucleating agents, plasticizers, agents for improving impact strength, said additive(s) preferably having a refractive index close to that of said copolymer. Preferably, the additive is present in the composition, in an amount by weight of from 0.01% to 10%, preferably from 0.01% to 5%, relative to the total weight of the composition.

According to one embodiment, the composition of the invention is manufactured by compounding or by dry blending of its various components. Dry blending is preferred because it comprises fewer steps and generally results in fewer risks of contamination (black spots, gels) of the composition than by compounding.

Said composition can be used according to the invention to manufacture granules or powders, which can in turn be used in conventional polymer shaping processes for the manufacture of filaments, tubes, films, sheets and/or objects that are injection-molded or molded and transparent and fatigue-resistant (Rossflex test). One subject of the present invention is in particular a process for manufacturing a transparent and fatigue-resistant object, said process comprising:
a step of supplying a copolymer in accordance with the one defined above;
an optional step of mixing said copolymer with at least one additive, so as to manufacture a composition as defined above;
a step of processing, in particular in a mold or a die, the copolymer or the composition at a temperature TO within the range from 180° C. to 270° C., preferably from 200° C. to 250° C.;
then a step of recovering the transparent object.

The term "processing" is understood here to mean any polymer shaping process, such as molding, injection molding, extrusion, coextrusion, hot pressing, multi-injection molding, rotational molding, sintering, laser sintering, etc., starting from the composition or copolymer according to the invention.

For the process for manufacturing objects, in particular molded, injection-molded or extruded objects according to the invention, granules are preferred. Less commonly, use is made of powders having a volume median diameter (measured according to the ISO 9276—parts 1 to 6 standard) within the range of from 400 to 600 µm. According to a particular shaping method of the process of the invention, in particular by sintering such as "laser sintering" or else by rotational molding, the compositions according to the invention are preferably in the form of a powder, the particles of which have a volume median diameter of less than 400 µm, preferably less than 200 µm. Among the powder manufacturing methods, mention may be made of cryogenic milling and microgranulation.

Another possible embodiment of the process of the present invention may further comprise a preliminary step of compounding PEBA with dyes, and/or any other additive, prior to said step of manufacturing granules or powder.

Another subject of the present invention is a shaped article such as a fiber, fabric, film, sheet, rod, tube or injection-molded part, which is transparent, comprising the copolymer according to the invention, or prepared by a process according to the invention as defined above.

This article advantageously consists of an article of sports equipment or a component of an article of sports equipment, such as a component of a sports shoe, an item of sports gear, such as ice skates, ski bindings, rackets, sports bats, boards, horseshoes, fins or golf balls, a recreational or do-it-yourself article, or a highway tool or piece of equipment exposed to the weather and subject to mechanical attack, a protective article, such as helmet visors, glasses or side arms for glasses, a motor vehicle component, such as headlamp protectors, rearview mirrors, small components of all-terrain motor vehicles, tanks, in particular of scooters, mopeds or motorbikes, an industrial, electrical, electronic or computer part, tablet, telephone, computer, safety accessory, sign, cornice lighting, information and advertising panel, display case, engraving, furnishing, shopfitting, decoration, contact ball, dental prosthesis, implant, ophthalmology article, hemodialysis membrane, optical fibers, work of art, sculpture, camera lenses, disposable camera lenses, printing substrate, in particular substrate for direct printing with UV inks for photographic picture, glazing, sunroof.

Examples

The examples below illustrate the present invention without, however, limiting the scope thereof. In the examples, unless otherwise indicated, all the percentages and parts are expressed by weight.

TABLE 1

| Properties | Composition | Examples according to the invention | | | comparative examples | | | |
|---|---|---|---|---|---|---|---|---|
| | | Ex1 | Ex2 | Ex3 | Cp1 | Cp2 | Cp3 | Cp4 |
| | Mn of the PA block | 11 930 | 12 350 | 2000 | 5000 | 19 000 | 2000 | 5000 |
| | Mn of the PE block | 650 | 650 | 1000 | 650 | 1000 | 650 | 650 |
| | COPA/PA | 17 mol of L12 1 mol of B.10 | 20 mol of A11 1 mol of B.10 | 17 mol of L12 1 mol of B.14 | 27 mol of 11 1 mol of B.10 | 10 mol of A11 1 mol of B.10 | Pure B.12 | 12 |
| Thermal properties | DSC  Tm (° C.) | Crystalline 165 | Crystalline 174 | Crystalline 154 | Crystalline 168 | Crystalline 165 | Amorphous | Crystalline 172 |
| | Enthalpy (J/g) | 50 | 57 | 40 | 48 | 41 | | 33 |
| | Tg (° C.) | N/A | N/A | N/A | N/A | N/A | 90 | N/A |
| Optical properties | Transparency | 84% | 82% | 85% | 78% | 81% | 91% | <35% |
| | Haze | 10 | 14 | 17 | 18 | 26 | 5 | nm |
| Injection moldability/ deformation | Injection moldability | OK | OK | OK | OK | OK | NOK | OK |
| | Hot deformation (annealing) | No | No | No | No | No | Yes | No |
| Mechanical properties | Notched 23° C. Charpy impact | No breakage | No breakage | No breakage | nm | breakage | No breakage | No breakage |
| | Rossflex | >100 000 | >100 000 | >150 000 | nm | 50 000 | 20 000 | 50 000 |

The PEBAs used contain PA blocks (respectively PA12/ B.10, PA11/B.10, PA12/B.14, PA11/B. 10, PA11/B.10, PAB. 12 and PA12) and PTMG blocks.

Although in the examples below the PTMG blocks are generally used as PE blocks, the invention is obviously not limited to this embodiment and it would not be outside the scope of the invention to replace the PTMG blocks with any other PE block as described above.

The size of the PA and PE blocks (number-average molecular mass) of the PEBAs is respectively indicated at the top of table 1.

All the properties of table 1 are measured respectively according to the standards indicated above at the beginning of the description.

The sheets and test specimens are obtained by injection molding using PEBA granules. In table 1 above:

"N/A" (in particular for the Tg) means that there is no Tg, absence of Tg.

"OK" (in particular for the injection moldability) means an easy injection molding, whereas "NOK" indicates here injection molding is not possible.

nm (in particular for the mechanical properties of Cp1 or the haze of Cp4) means that these properties were not measured during these tests.

Table 1 shows that only the PEBAs of examples 1 to 3 (Ex1, Ex2, and Ex3) according to the invention combine at the same time:

good injection moldability, no deformation after heat treatment (annealing at 90° C., 10 μminutes), high transparency (transmittance of at least 80% at 560 nm on a 2-mm thick polished sheet, measured using a Konica-Minolta 3610d spectrophotometer, according to the ISO 13468 standard), low haze (not exceeding 17), resistance to elastic fatigue (Rossflex greater than 100 000), unlike comparative examples 1 to 4 (Cp1 to Cp4).

The invention claimed is:

1. A copolymer with a rigid polyamide (PA) block and a flexible polyether or polyester (PE) block, wherein said polyamide block is semicrystalline and consists of a copolyamide of W/Y.Z type, wherein:

(i) W is a lactam or an alpha,omega-aminocarboxylic acid;

(ii) Y is a cycloaliphatic diamine;

(iii) Z is a first aliphatic and/or aromatic dicarboxylic acid;

and the W/Y.Z molar ratio is between 14/1 and 20/1 limits excluded, wherein the W/Y.Z molar ratio is a comparison of the moles of monomer W to the total moles of monomer Y.Z, and wherein monomer Y.Z is an equimolar combination of units Y and Z.

2. The copolymer as claimed in claim 1, wherein the W/Y.Z molar ratio is between 14/1 to 15/1 limits excluded.

3. The copolymer as claimed in claim 1, wherein the percentage by weight of the various components is such that:

(i) the percentage of the monomer W is within the range of 75% and 98% by weight;

(ii) the percentage of the Y.Z monomer is within the range of 2% and 25%;

forming a total of 100% of the polyamide block.

4. The copolymer as claimed in claim 1, wherein the percentage of polyamide blocks in the copolymer is within the range of from 60% to 97%, and the percentage of polyether blocks in the copolymer is within the range of from 3% to 40%.

5. The copolymer as claimed in claim 1, wherein W is chosen from: caprolactam, oenantholactam, lauryllactam, aminocaproic acid, 7-aminoheptanoic acid, 11-aminoundecanoic acid and 12-aminododecanoic acid.

6. The copolymer as claimed in claim 1, wherein the cycloaliphatic diamine Y is chosen from: bis(3,5-dialkyl-4-aminocyclohexyl)methane, bis(4-aminocyclohexyl)methane (BACM), bis(3,5-dialkyl-4-aminocyclohexyl)ethane, bis(3,5-dialkyl-4-aminocyclohexyl)propane, 2,2-bis(3-methyl-4-aminocyclohexyl)propane (BMACP), bis(3,5-dialkyl-4-aminocyclohexyl)butane, bis(3-methyl-4-aminocyclohexyl) methane (BMACM or MACM), p-bis(aminocyclohexyl) methane (PACM), isopropylidenedi(cyclohexylamine) (PACP), isophoronediamine (IPD), 2,6-bis(aminomethyl) norbornane (BAMN).

7. The copolymer as claimed in claim 1, wherein the first aliphatic and/or aromatic dicarboxylic acid is chosen from aliphatic and/or aromatic dicarboxylic acids having from 6 to 36 carbon atoms.

8. The copolymer as claimed in claim 1, wherein:
the number-average molecular mass of the PA blocks is within the range of from 500 to 18 000 g/mol; and
the number-average molecular mass of the PE blocks is within the range of from 500 to 2000 g/mol.

9. The copolymer as claimed in 1, wherein the PE blocks are derived from at least one polyalkylene ether polyol.

10. The copolymer as claimed in claim 9, wherein the polyalkylene ether diol is chosen from polyethylene glycol (PEG), polypropylene glycol (PPG), polytrimethylene glycol (PO3G), polytetramethylene glycol (PTMG) and mixtures thereof.

11. The copolymer as claimed in claim 1, wherein it has:
a transparency such that the transmittance at 560 nm through a 2-mm thick sheet is at least 80%;
a melting point within the range of from 130° C. to 210° C.; and
a crystallinity such that the enthalpy of fusion (delta Hm(2)) during the second heating is within the range of from 30 to 60 J/g;
the melting point and the enthalpy of fusion being measured according to the ISO 11357-3: 2013 DSC standard.

12. A process for preparing a copolymer as defined in claim 1, comprising the steps of:
preparing the polyamide PA blocks by polycondensation in a first step, wherein the polyamide PA blocks are prepared from
the lactam or an alpha,omega-aminocarboxylic acid W;
the cycloaliphatic diamine Y and the first aliphatic and/or aromatic dicarboxylic acid Z;
wherein the polyamide PA blocks are optionally prepared in the presence of a chain stopper chosen from a second dicarboxylic acid; and
reacting the polyamide PA blocks W/Y.Z obtained with the polyether PE blocks in a second step, in the presence of a catalyst.

13. A process for preparing a copolymer as defined in claim 1, wherein the process comprises a one-step polycondensation with:
the lactam or alpha,omega-aminocarboxylic acid W;
the cycloaliphatic diamine Y and the first aliphatic and/or aromatic dicarboxylic acid Z;
optionally a chain stopper chosen from a second dicarboxylic acid;
the polyether PE blocks; and
a catalyst.

14. A shaped article which is transparent, comprising a copolymer as defined in claim 1.

15. The shaped article as claimed in claim 14, wherein the article is selected from the group consisting of an article of sports equipment or a component of an article of sports equipment; a motor vehicle component; tanks; an industrial, electrical, an electronic or computer part, a tablet, a telephone, a computer, a safety accessory, a sign, a cornice lighting, an information and advertising panel, a display case, an engraving, a furnishing, a shopfitting, a decoration, a contact ball, a dental prosthesis, an implant, an ophthalmology article, a hemodialysis membrane, optical fibers, a work of art, a sculpture, camera lenses, disposable camera lenses, a printing substrate for direct printing with UV inks for photographic pictures, a glazing, and a sunroof.

\* \* \* \* \*